United States Patent [19]

Bonifacio

[11] 4,363,727
[45] Dec. 14, 1982

[54] FUEL PURIFIER

[75] Inventor: Filippo Bonifacio, Turin, Italy
[73] Assignee: Celeste Carrer, Turin, Italy
[21] Appl. No.: 316,498
[22] Filed: Oct. 29, 1981
[51] Int. Cl.³ .................... B01D 35/02; B01D 17/02
[52] U.S. Cl. .................................. 210/96.1; 210/100; 210/104; 210/110; 210/446
[58] Field of Search .............. 210/96.1, 100, 104, 210/115, 116, 129, 446, 110

[56] References Cited

U.S. PATENT DOCUMENTS

| | | | |
|---|---|---|---|
| 3,386,581 | 6/1968 | Gough | 210/100 X |
| 3,836,000 | 9/1974 | Jakubek | 210/104 |
| 3,878,094 | 4/1975 | Conley et al. | 210/104 X |

*Primary Examiner*—John Adee

[57] ABSTRACT

A fuel purifier for separating and removing polluting water from hydrocarbon fuels, comprising a decantation vessel having at its upper end a normally open inlet and an outlet opening and at its bottom end a second normally closed outlet opening, a source of light and a photocell arranged in opposite positions in a tubular central wall portion of the decantation vessel, and a float vertically movably mounted within the decantation vessel to normally close the path of light from the source of light to the photocell, but adapted to move under the action of the water accumulating at the bottom of the decantation vessel to an upper position in which the photocell receives light from the source of light to open the second outlet opening to drain the water.

3 Claims, 3 Drawing Figures 4,363,727

FUEL PURIFIER

FIELD OF THE INVENTION

This invention relates to a device for separating liquids of different densities, particularly for separating liquid fuels such as gasoline, diesel oil, kerosene and the like from polluting water. The invention may find particularly useful application in the purification of diesel oil or kerosene in heating installations in dwelling houses and in fuel pumps for supplying fuel to motor vehicles.

BACKGROUND OF THE INVENTION

Often water infiltrates into tanks and reservoirs for liquid fuels such as diesel oil, kerosene and the like for feeding burners of heating installations in dwelling houses. The water tends to deposit on the bottom of the tank below the fuel and is sooner or later sucked in by the burner feed pump together with or instead of the fuel. This causes serious inconveniences which not only lead to stopping of the heating installation but also to heavy expense for repairing the damage produced by the water in the heating apparatus.

A similar problem is encountered in fuel pumps for supplying motor vehicles in which infiltrations of water occur in the fuel tanks buried below the ground. Also in this case the water accumulates on the bottom of the fuel tank and is then delivered to the motorist instead of the gasoline or other fuel.

Even if exceptional security measures are taken to prevent the water from penetrating into the fuel reservoir, water tends to accumulate nevertheless in the fuel reservoir, for example, by condensation. Once the water has condensed and precipitated on the bottom of the reservoir, it can no longer leave it except through the fuel delivery pump. Thus, the water will accumulate in the fuel reservoir up to an unacceptable amount such as to cause the aforementioned inconveniences.

It also happens that water is introduced into the fuel reservoirs intentionally by dishonest suppliers with the intention of cheating their clients who then not only do not receive the amount of fuel they have paid for, but additionally have their heating installation damaged.

SUMMARY OF THE INVENTION

It is an object of the present invention to provide a fuel purifier capable of detecting the presence of water in a fuel reservoir and of draining the water automatically to prevent it from being delivered to a subsequent user, to resume its normal operation only when the fuel taken from the reservoir is free of water.

Another object of the present invention is to provide a fuel purifier of the type described above which ensures reliable operation even if it operates only rarely.

These and other objects of the present invention, which will become apparent from the following description, are achieved according to the present invention by providing a fuel purifier which comprises a decantation vessel having an inlet opening and an outlet opening for the liquid to be purified, both normally open and arranged at an upper end of the vessel, and a second outlet opening normally closed and arranged at a lower end of the vessel; a source of light for casting a beam of light through a lower wall portion of the vessel and a photocell for receiving the beam of light, and an opaque float of a weight heavier than the liquid to be purified, but lighter than water, said float being movably mounted in the vessel between a lower position for intercepting said beam of light and an upper position for receiving said beam of light, the photocell controlling the closure of said first outlet opening and the opening of said second outlet opening when the float is in its upper position.

DESCRIPTION OF PREFERRED EMBODIMENT

Figures 1, 2:
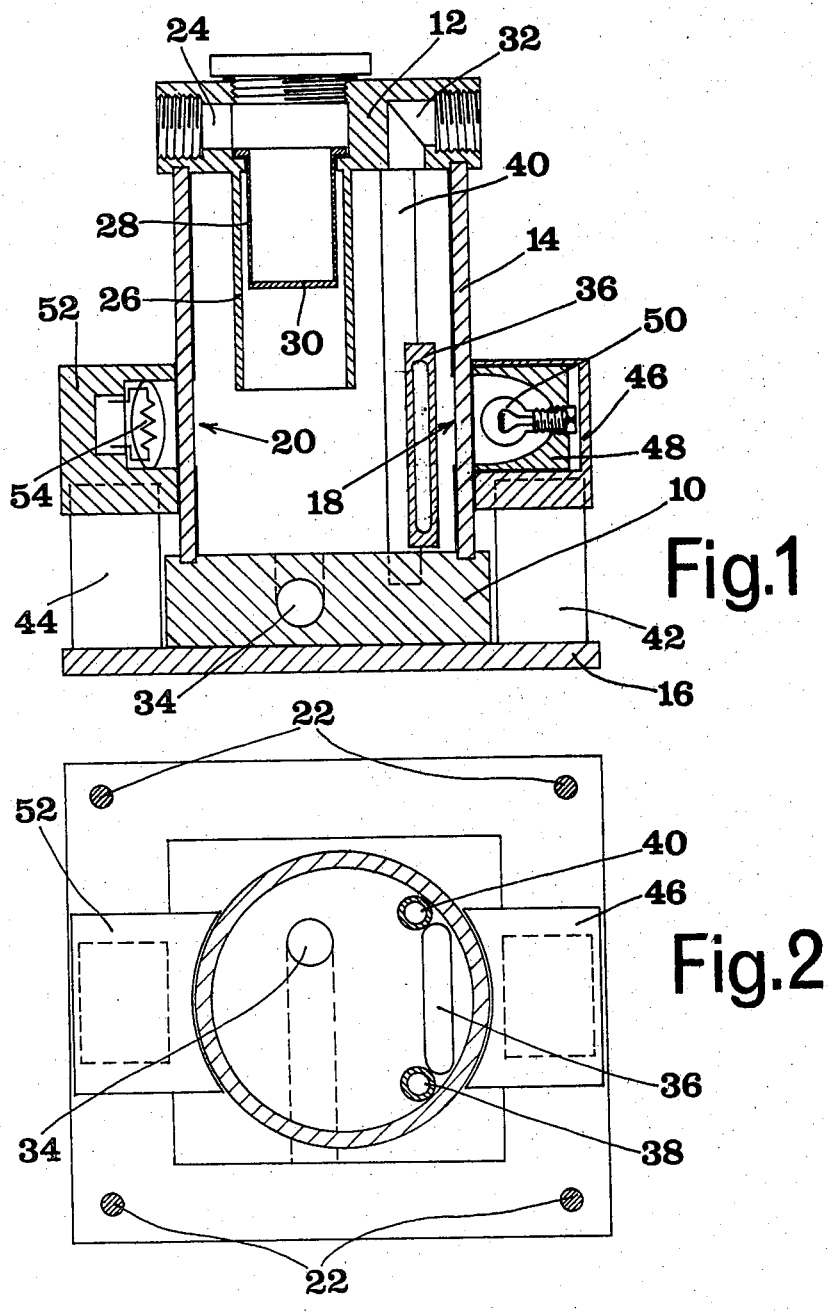
FIG. 1 is a vertical section through a fuel purifier according to the invention.
FIG. 2 is a horizontal section through the fuel purifier of FIG. 1.

Referring now to FIGS. 1 and 2, a fuel purifier according to the invention comprises a decantation vessel having lower and upper end portions 10 and 12, respectively, and a cylindrical tubular central wall portion 14 sealingly mounted therebetween. The lower end portion 10 stands on a base 16. The tubular central portion 14 is preferably made of a transparent rigid material such as plexiglas made opaque on its entire surface with the exception of a pair of diametrically opposed transparent windows 18 and 20 located near the lower end of the tubular central portion 14. The two end portions 10 and 12 are held assembled with the tubular central portion 14 by tie rods 22.

The upper end portion 12 is provided with a liquid inlet opening 24 which within the tubular central portion 14 opens into a tubular duct 26 extending downwardly approximately up to the level of the windows 18, 20. A filter net 28 in the form of a tubular bag extends within the tubular duct 26 over part of the length thereof and terminates with a disk 30. The filter net 28 serves both for filtering the liquid fed into the tubular central portion 14 and for breaking the turbulent jet of liquid to cause it to flow in a laminar fashion along the inner wall of the tubular duct 26.

The upper end portion 12 is further provided with a liquid outlet opening or connection 32. A further liquid outlet opening 34 is provided in the lower end portion 10 of the tubular central portion 14. As will be described hereinafter, the openings 24, 23 and 34 are controlled by solenoid valves not shown in FIGS. 1 and 2, whose operation will be explained later with reference to FIG. 3.

An opaque float 36 in the form of a tablet is held in a vertical position within the tubular central portion 14 by a pair of vertical rods 38 and 40 which permit the float 36 to move vertically within the tubular central portion 14 between a lower area including the windows 18, 20 and an upper area in which the float clears these windows. The float 36 is made of a weight heavier than the liquid to be purified, for example, a hydrocarbon fuel such as diesel oil, but lighter than the polluting liquid, i.e. the water. This condition can be obtained by selecting a material of a density intermediate of that of these two liquids or by the use of a heavier material when the float is made in the form of a hollow tablet, as shown in FIG. 1. In this latter case the buoyancy of the float can be accurately adjusted by incorporating therein a small amount of ballast material which can be introduced into the inner cavity of the float through an opening to be closed by a plug not shown in the drawings for reasons of obviousness.

A pair of upright supporting standards 42 and 44 extend upwardly from the base 16. The standard 42 supports a lamp holder 46 mounting a parabolic reflector 48 accommodating a light bulb 50 casting a beam of light through the window 18 toward the diametrically opposed window 20. The other standard 42 supports a holder 52 for a photocell 54 having a photoresistor or similar element capable of detecting light through the window 20.

Figure 3:
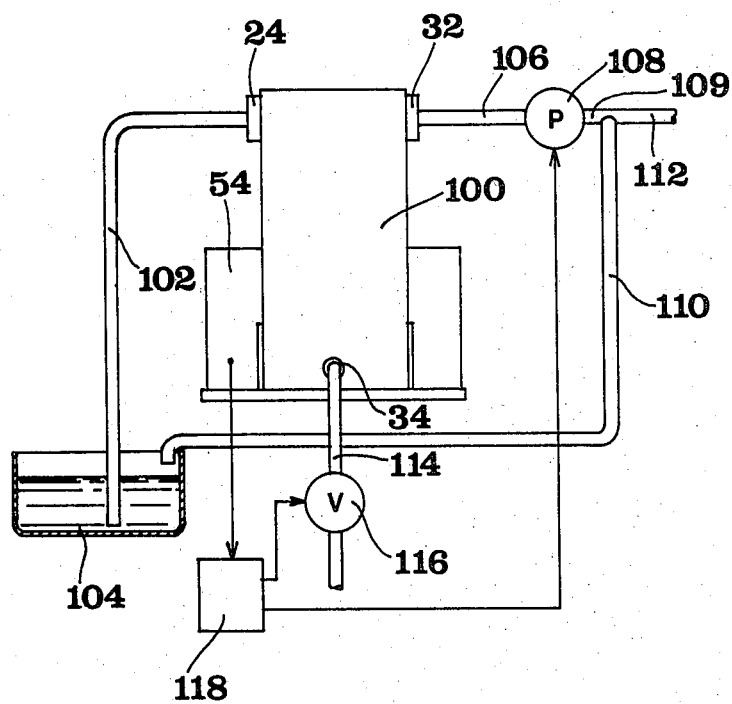
FIG. 3 is a schematic diagram of a heating installation provided with a fuel purifier according to the invention.

FIG. 3 shows a schematic diagram of a heating installation provided with a fuel purifier as shown in FIGS. 1 and 2. The described fuel purifier is schematically indicated by 100 in FIG. 3 and connected with its inlet opening 24 to a duct 102 for feeding fuel from a tank or reservoir 104 and with its outlet opening 32 to a duct 106 leading to a pressure pump 108 which feeds the burner of the heating installation (not shown). The pump 108 is a circulation pump in a manner known per se and has an outlet opening 109 connected to a conduit 110 for conducting the pumped liquid back to the reservoir 104, and a conduit 112 leading to the burner (not shown) of the heating installation. The outlet opening 34 is connected to a conduit 114 leading to drain through a normally closed solenoid valve 116.

The photocell 54 is electrically connected by appropriate logic circuits to the pump 108 and the solenoid valve 116 to stop the pump 108 and open the solenoid valve 116 when the photocell is energized by a beam of light transmitted through the window 20. As the electric and logic circuits required to cause these operations are obvious to one skilled in the art they are not described here in detail.

OPERATION OF THE FUEL PURIFIER

When the fuel purifier shown in FIGS. 1 and 2 is connected to a heating installation as shown in FIG. 3 and the pump 108 is actuated to feed the burner of the heating installation, or some other fuel consuming or pumping installation, the pump 108 will suck in liquid through the duct 106, the purifier 100 and the duct 102 as the openings 24 and 32 are open and the pumped liquid can reach the pump 108 after having completely filled the tubular central portion 14 of the purifier (FIGS. 1 and 2). If the fuel is not polluted by water, the float 36 will remain in its lower position near the bottom of the tubular central portion 14 of the purifier, intercepting the light emitted by the bulb 50 and thus preventing actuation of the photocell 54. Under these conditions the normally closed solenoid valve 116 prevents the fuel from being discharged through the outlet opening 34. The restraining action of the tubular inlet duct 26 and of the filter net 28 prevent turbulent flow of the entering liquid which would cause undesired movement and lifting of the float 36 with the result of incidental undesired energization of the photocell 54.

The combined action of the tubular inlet duct 26 and filter net 28 also causes a separation of the water from the fuel if water should be intimately mixed or emulsified with the fuel because of vortex flow in the conduits. Therefore, the water which may be present in the fuel will deposit on the bottom of the tubular central portion 14 due to its heavier weight and when an appreciable amount of water has accumulated, it will start lifting of the float 36 until the latter leaves the area of the window 18 and 20. This will energize the photocell 54 which stops the pump 108 and simultaneously opens the solenoid valve 116 to discharge the accumulated water through the outlet opening 34. When the water has been completely drained off and the entire inner space of the tubular central portion 14 is again filled with fuel, the float will be reimmersed in the fuel and will again intercept the beam of light to cause the installation to resume its normal operation by closing the solenoid discharge valve 116 and simultaneously reactivating the pump 108.

The filtering and restraining effect of the assembly 26, 28 ensures separation of the water from the fuel and its gradual deposition on the bottom of the decantation vessel so that the water can never reach the outlet opening even if it accumulates very slowly. Should the reservoir 104 contain considerable amounts of water so that the liquid entering the fuel purifier through the inlet opening 24 would be formed exclusively by water, the solenoid valve 116 would remain permanently open to drain the water immediately as it arrives so that also in this case no water can be sucked in by the pump 108.

Preferably the described fuel purifier is provided with auxiliary safety devices obvious to one skilled in the art to ensure the immediate detection of defects of operation such as the extinction of the light bulb 50 or other similar trouble that might produce undesired effects such as failure to purify the fuel or accidental draining of unpolluted fuel.

Although a preferred embodiment of the invention has thus been described in detail and illustrated in the accompanying drawings, it is to be understood that the invention is not limited to this precise embodiment and that numerous changes and modifications obvious to one skilled in the art may be made therein without thereby departing from the scope of the invention as defined by the appended claims.

I claim:

1. A device for separating liquids of different densities, particularly for purifying liquid hydrocarbon fuels from water, comprising a decantation vessel having in inlet opening and an outlet opening for the liquid to be purified, both normally open and arranged at an upper end of said decantation vessel, and a second outlet opening normally closed and arranged at a lower end of said decantation vessel; a source of light for casting a beam of light through a lower wall portion of said decantation vessel; a photocell arranged on a lower wall portion of said decantation vessel in a position opposite said source of light for receiving said beam of light; an opaque float of a weight heavier than the liquid to be purified, but lighter than water, said opaque float being movably mounted within said decantation vessel for movement between a lower position for intercepting said beam of light and an upper position for receiving said beam of light; said photocell being arranged to control closure of said first outlet opening and opening of said second outlet opening when said opaque float is in said upper position.

2. A device for separating liquids as claimed in claim 1, wherein said decantation vessel has a tubular central wall portion made of transparent material.

3. A device for separating liquids as claimed in claim 1, wherein said liquid inlet opening of said decantation vessel is provided with a filter net in the form of a tubular bag extending into and surrounded by a downwardly open tubular duct having a diameter slightly greater than that of said filter net to cause said liquid entering the device to flow in a laminar fashion.

* * * * *